Figure 1:
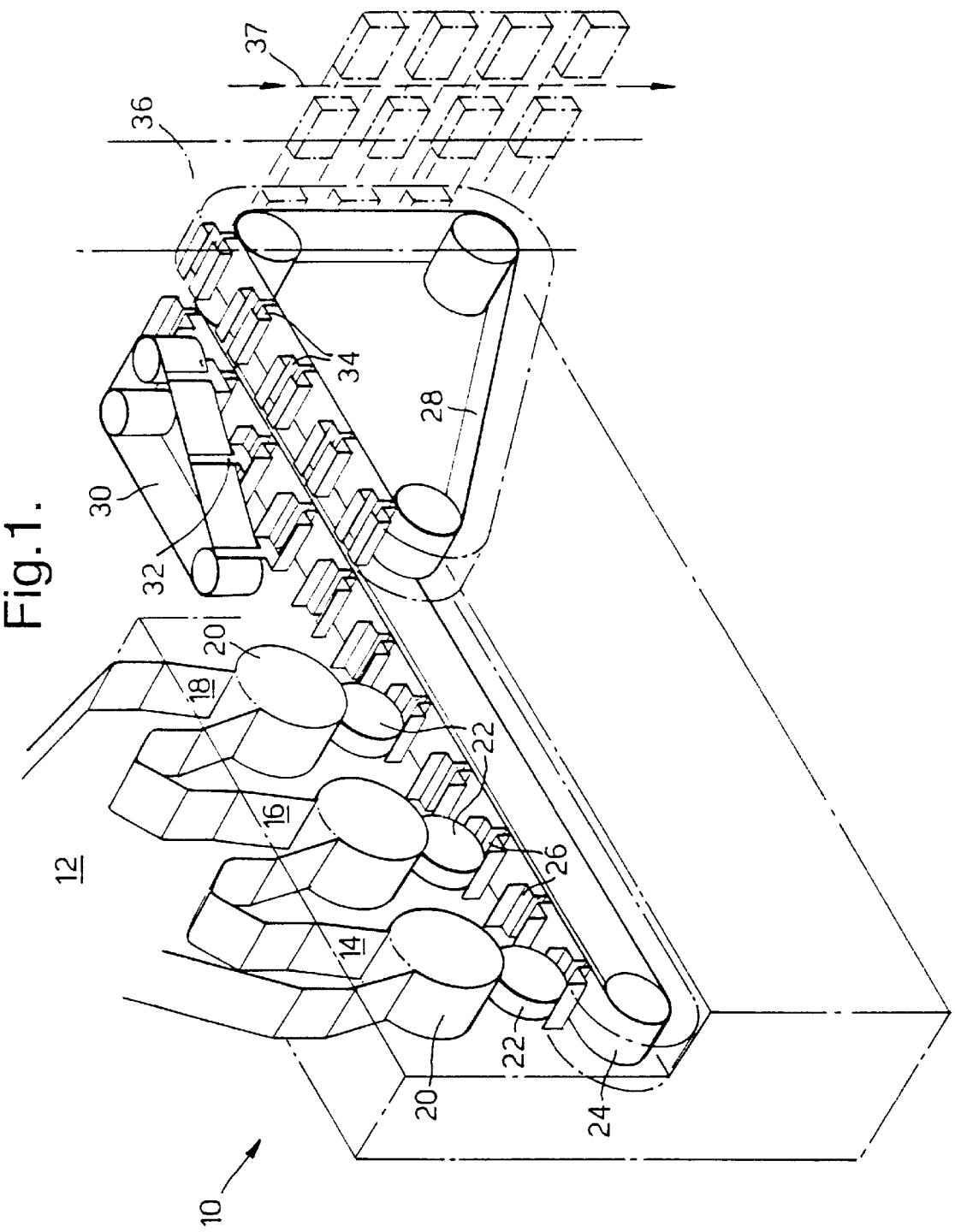

United States Patent [19]
Bailey et al.

[11] Patent Number: 5,860,506
[45] Date of Patent: Jan. 19, 1999

[54] TRANSFERRING ROD-LIKE ARTICLES

[75] Inventors: Thomas William Bailey; James Goodwin; Simon Charles Martin, all of Coventry; Geoffrey William Vernon, Bucks, all of Great Britain

[73] Assignee: Molins PLC, Buck, United Kingdom

[21] Appl. No.: 693,276

[22] PCT Filed: Feb. 13, 1995

[86] PCT No.: PCT/GB95/00290

§ 371 Date: Aug. 15, 1996

§ 102(e) Date: Aug. 15, 1996

[87] PCT Pub. No.: WO95/21771

PCT Pub. Date: Aug. 17, 1995

[30]     Foreign Application Priority Data

Feb. 15, 1994  [GB]  United Kingdom ............... 9402893
Jul. 15, 1994  [GB]  United Kingdom ............... 9414385

[51] Int. Cl.⁶ .................................................. B65G 17/46
[52] U.S. Cl. ........................................ 198/471.1; 198/450
[58] Field of Search ........................... 198/469.1, 471.1, 198/475.1, 478.1, 450

[56]           References Cited

U.S. PATENT DOCUMENTS 3,435,940  4/1969  Sesagnoli ............................. 198/471.1
4,614,263  9/1986  Nagata et al. ................... 198/471.1 X
4,666,031  5/1987  Walker .................................... 198/450
5,480,021  1/1996  Belvedesi et al. ................... 198/471.1

FOREIGN PATENT DOCUMENTS 246411   11/1987  European Pat. Off. .
512493   11/1992  European Pat. Off. .
2187611   1/1974  France .
2243911   3/1974  Germany .

*Primary Examiner*—James R. Bidwell
*Attorney, Agent, or Firm*—Antonelli, Terry, Stout & Kraus, LLP

[57]            ABSTRACT

A system for delivering rows of cigarettes, each for forming one layer of a bundle of cigarettes to be packed in a packing machine, includes a number of fluted planetary wheels (42) carried by an annular carrier (44) along a path on which cigarettes are picked up directly from the lower ends of channels (40) formed between vanes (38) in the hopper of the machine. The wheels (42) transfer the cigarettes in rows to flute sets (48) on a coaxial drum (46) from which the rows are further transferred to a delivery drum (22). Generally the packing machine includes three such systems, one for each layer of the bundle of cigarettes to be packed. In an alternative system cigarettes forming one row are picked up substantially simultaneously by row carriers (220) mounted on planetary wheels (226) so as to follow an hypocycloidal path.

20 Claims, 10 Drawing Sheets

TRANSFERRING ROD-LIKE ARTICLES

This invention relates to transferring rod-like articles, particularly transferring rows of cigarettes for subsequent packing in a cigarette packing machine.

In order to achieve higher speeds in cigarette packing machines it is desirable that as many parts of the machine as possible should operate continuously rather than intermittently. In particular it is desirable that the conveyor in which the groups of cigarettes are assembled into bundles for subsequent wrapping should run continuously. The present invention is particularly but not exclusively concerned with transfer apparatus suitable for feeding cigarettes to such a conveyor, particularly from a hopper or other region in which the cigarettes are substantially stationary.

According to one aspect of the invention, an apparatus for transferring rod-like articles includes means for supplying articles to a plurality of adjacent delivery positions arranged in a row, conveyor means including means for receiving articles from said positions, means for translating said conveyor means along a path extending adjacent said row so that said receiving means receives articles from said positions, and means for delivering a row of articles from said conveyor means. Said conveyor means may comprise rotary conveyor means. Preferably said receiving means includes means, e.g. flutes, defining individual cigarette positions. Said conveyor means may receive articles sequentially, e.g. in flutes, or it may receive several or all articles in a row substantially simultaneously. The row of adjacent delivery positions may be straight, or may be curved, e.g. so as to cooperate with said conveyor means.

The delivering means may deliver the row to a further conveyor, which may be a rotary drum or an endless band conveyor and may include flutes for receiving individual cigarettes or pockets or other means adapted to receive a row of cigarettes.

In a preferred arrangement the conveyor means comprises a plurality of planetary wheels and the translating means comprises an annular carrier for said wheels. Each wheel may have the same number of flutes as there are delivery positions in said row. Preferably the planetary wheels deliver successive rows of articles to a further conveyor in such manner that there are spaces between successive rows. The further conveyor may comprise a fluted drum rotated about the same axis as the annular carrier and having a lesser radius than the path of the planetary wheels. In a preferred arrangement the planetary wheels are capable of receiving an article from said row in one flute substantially while transferring an article from another flute to said rotary drum. Preferably the planetary wheels, annular carrier and rotary drum move continuously.

In another preferred arrangement the receiving means is constrained to move on a path which describes an hypocycloid. The receiving means may comprise means carried by a planetary wheel and arranged to receive a row of cigarettes at a node of the hypocycloid path and to deliver said cigarettes at a position between nodes on said path, preferably at a speed matched to that of a receiving conveyor, e.g. containing pockets.

According to another aspect of the invention apparatus for transferring rod-like articles includes means for supplying articles to a plurality of adjacent delivery positions arranged in a row, first conveyor means for receiving articles from said positions and second conveyor means for receiving articles from said first conveyor means, said first and second conveyor means being rotatable about a common axis. In a preferred arrangement said first conveyor means comprises at least one planetary conveyor. Thus the first conveyor means may comprise a plurality of fluted planetary members carried by an annular member, and said second conveyor means may comprise a fluted drum arranged inside the annular member.

Figure 2:
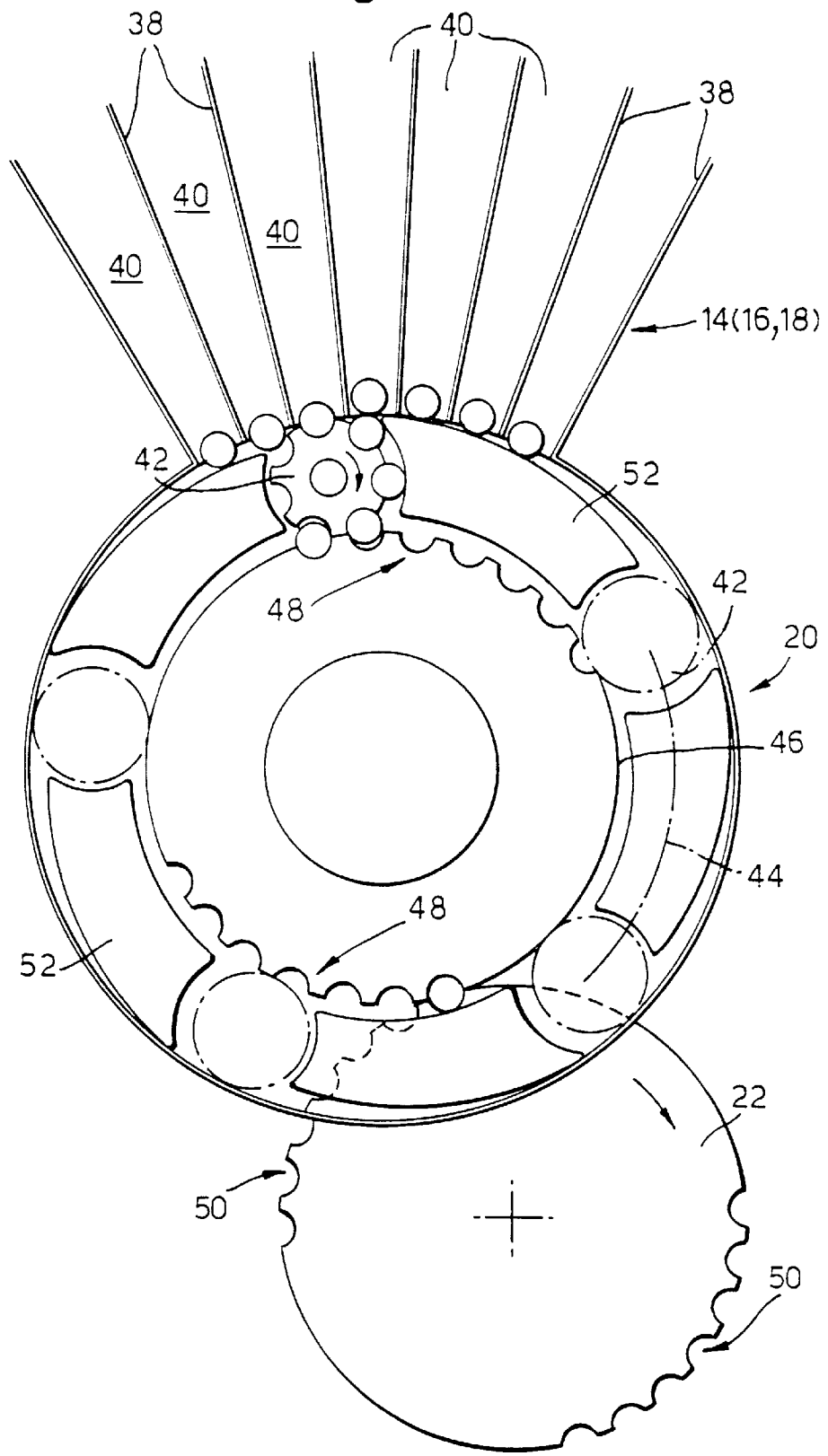
Figure 3:
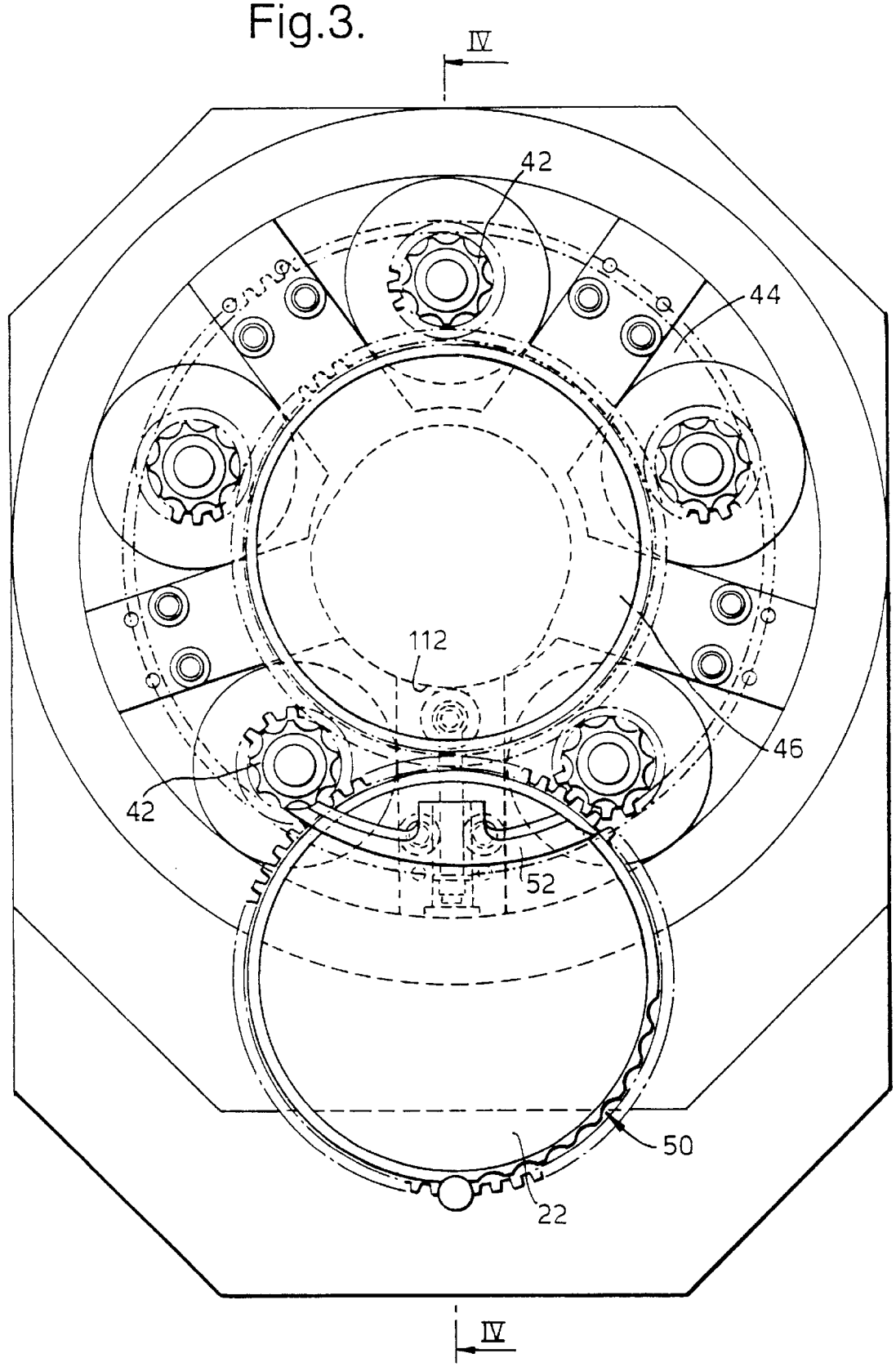
Figure 4:
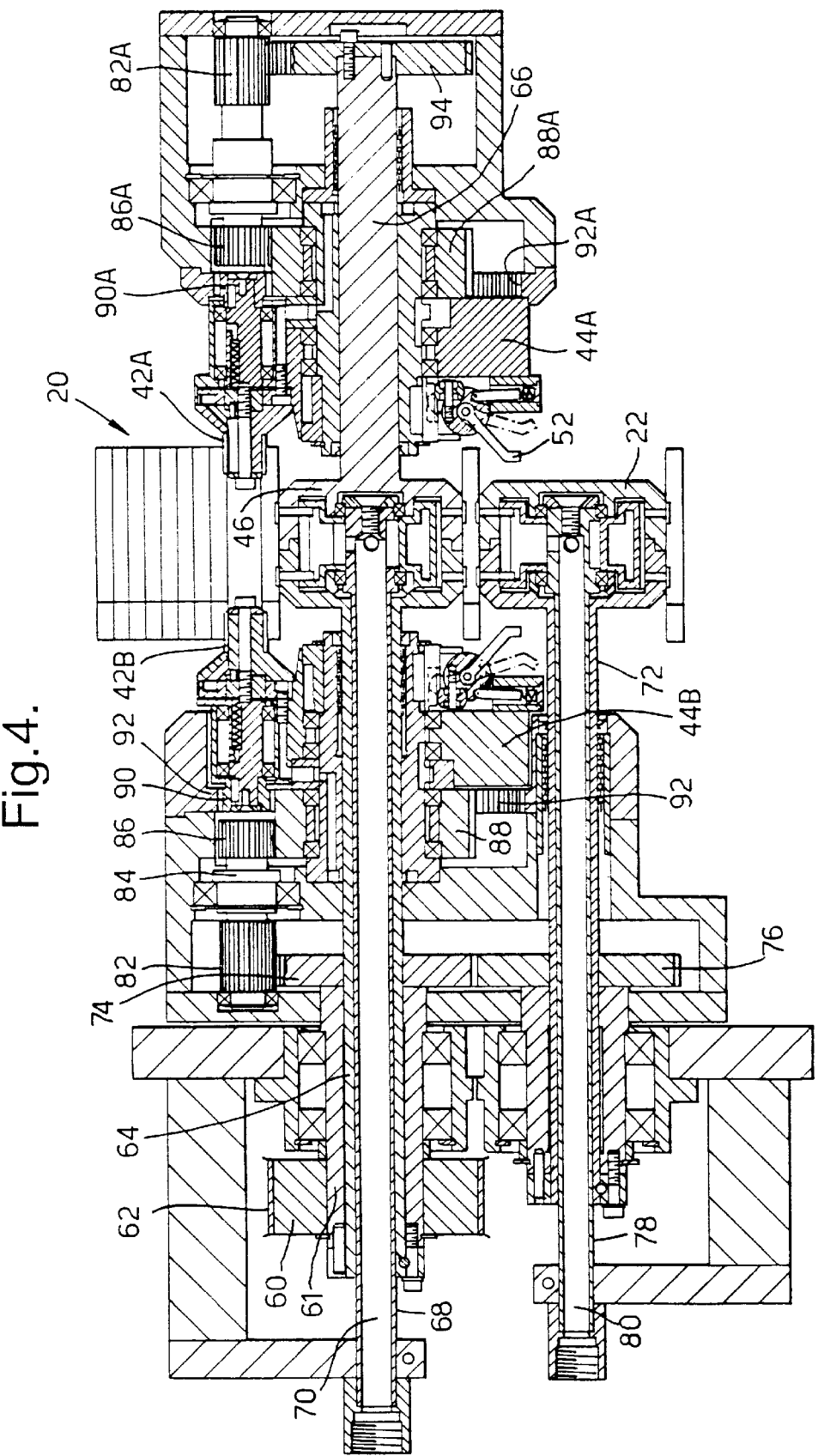
Figure 5:
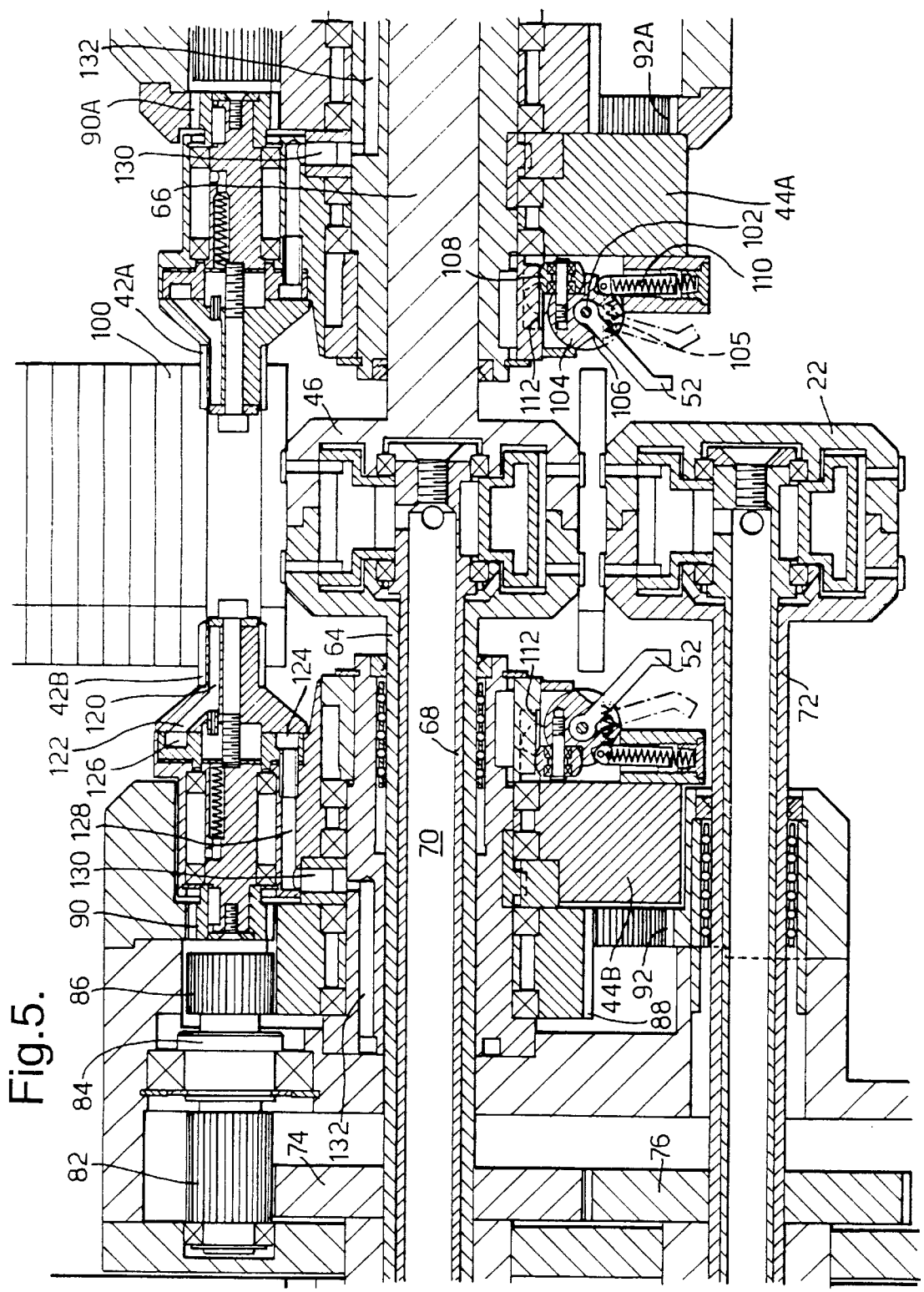
Figure 6:
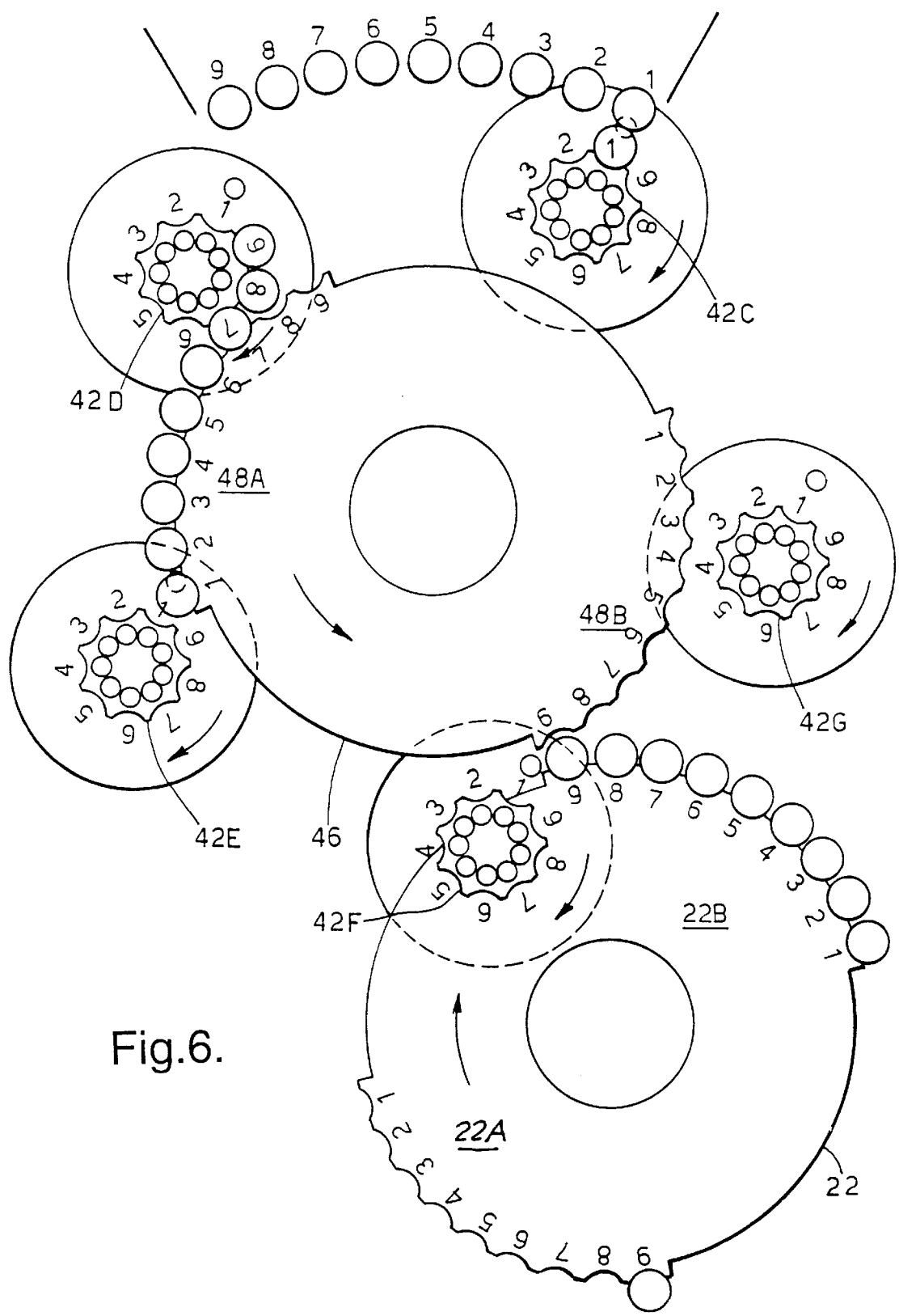
Figure 7:
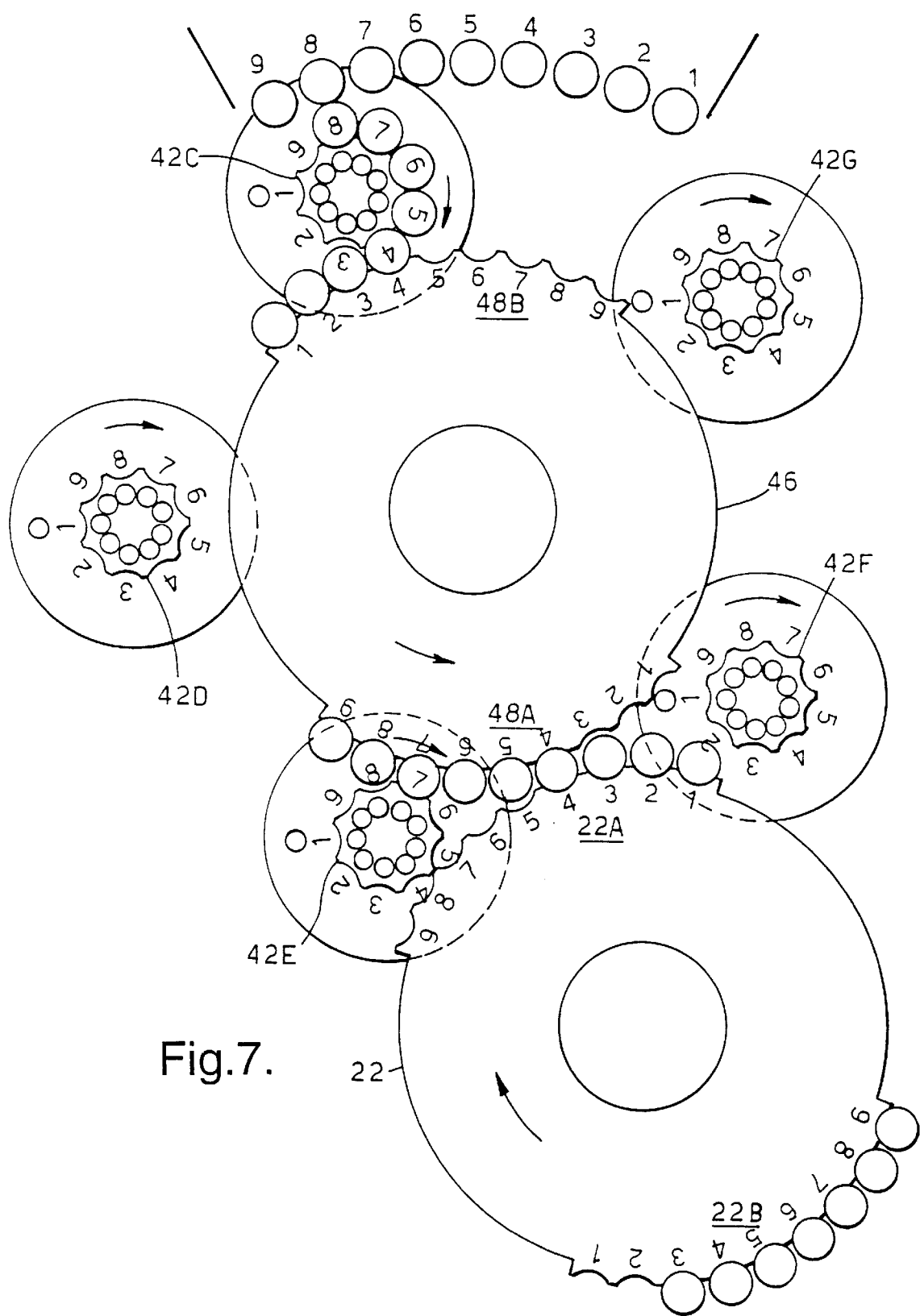
Figure 8:
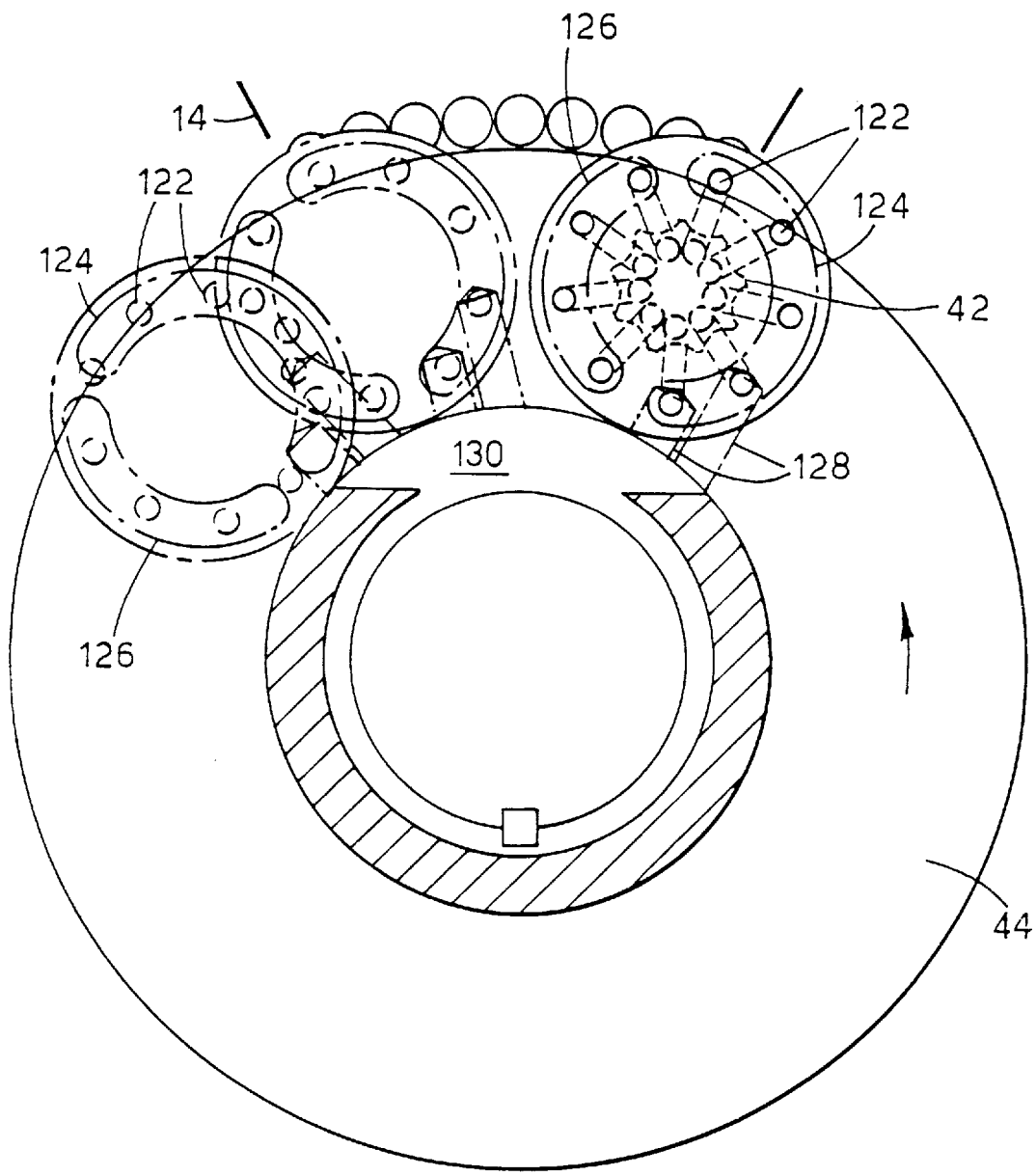
Figure 9:
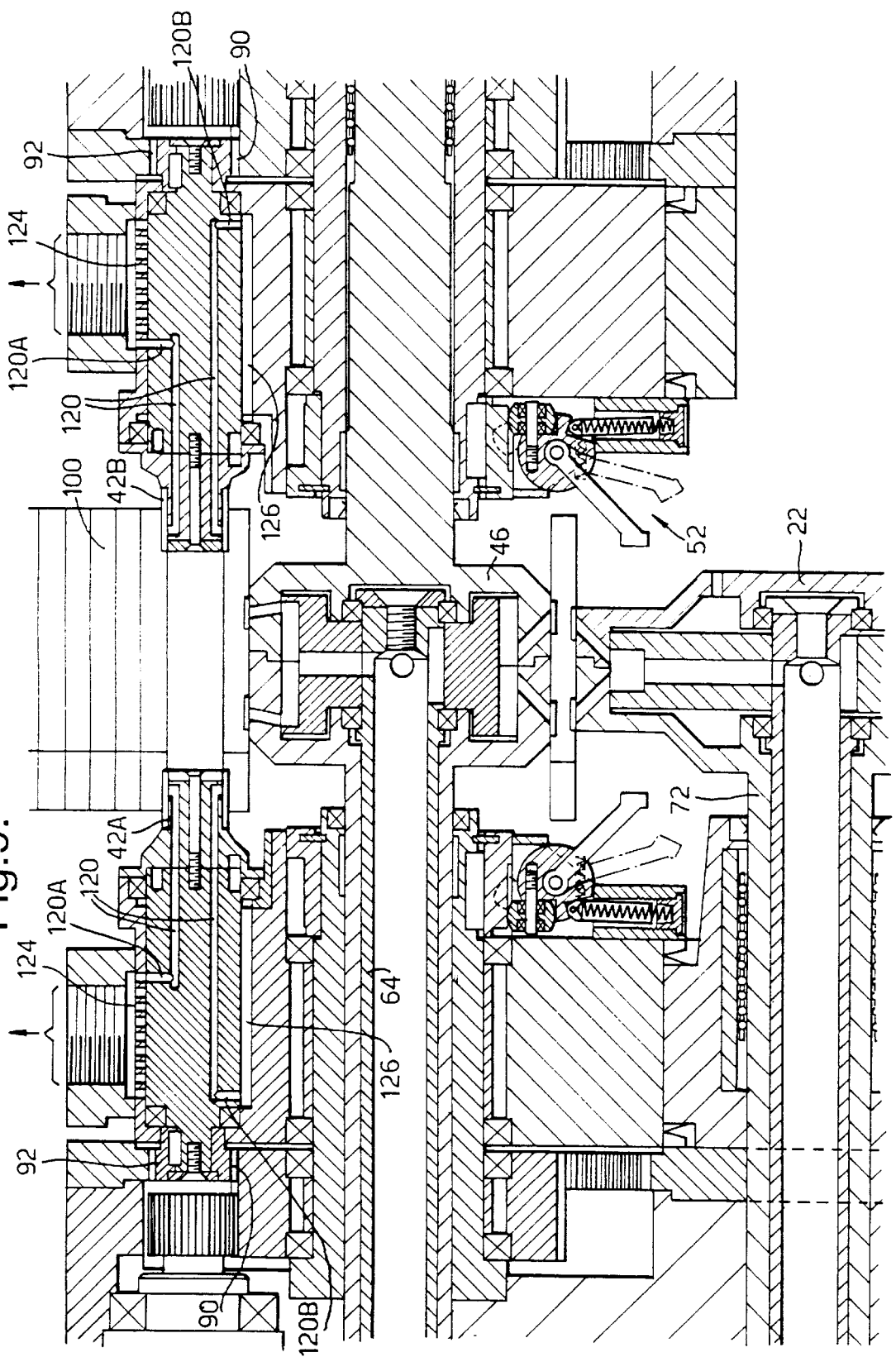
Figure 10:
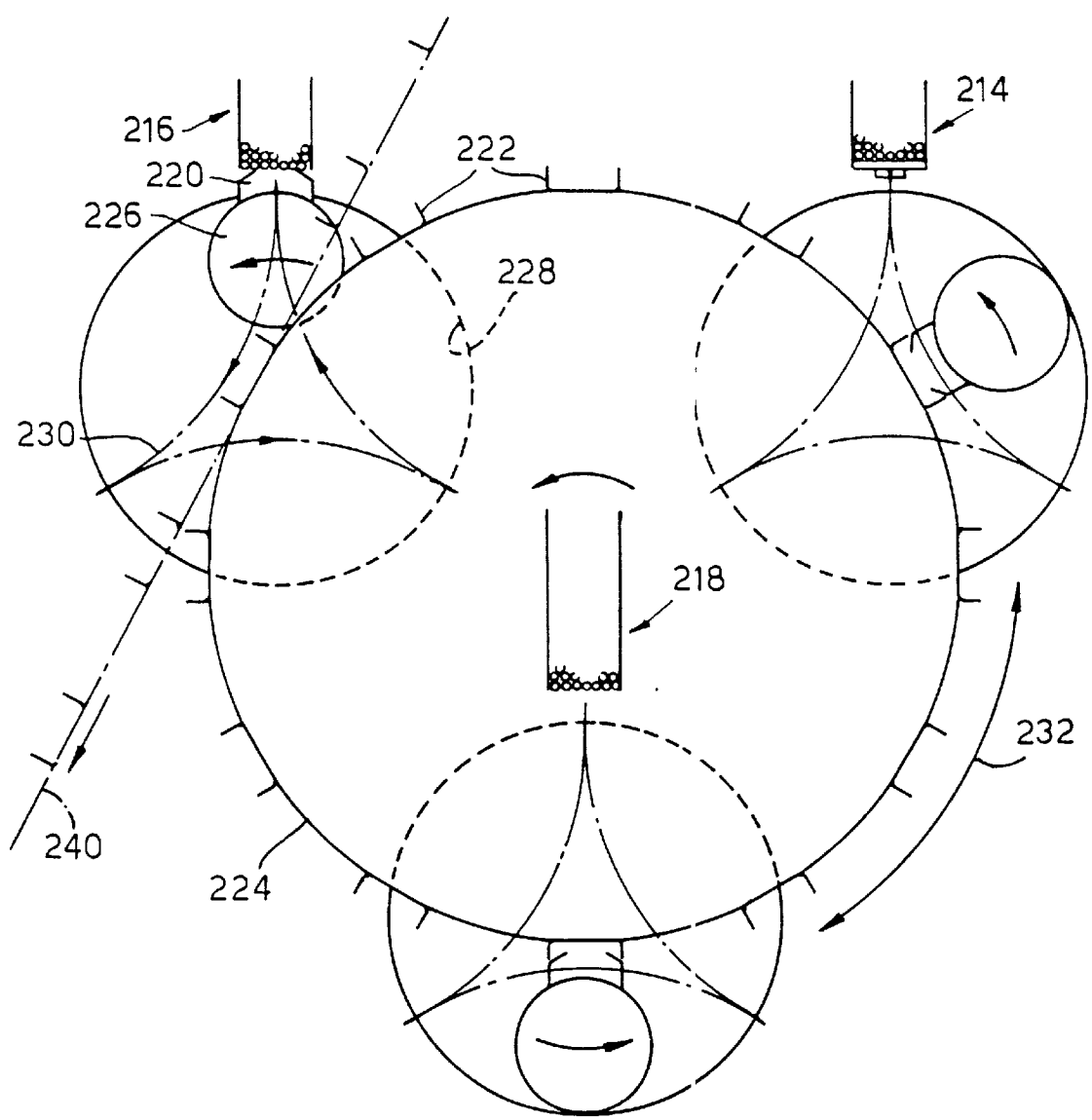

The invention will be further described, by way of example only, with reference to the accompanying diagrammatic drawings, in which:

FIG. 1 is an isometric view of part of a cigarette packing machine,

FIG. 2 is a side view of part of the machine in FIG. 1, including a hopper outlet and transfer conveyor arrangement, FIG. 3 is a view, similar to that of FIG. 2, of a slightly modified transfer conveyor arrangement, FIG. 4 is a sectional view on the line IV—IV in FIG. 3, FIG. 5 is an enlarged view showing a portion of FIG. 4 in more detail, FIGS. 6 and 7 are schematic views of the transfer conveyor arrangement in different operative positions, FIG. 8 is a schematic view of the transfer conveyor arrangement showing suction valve timing, FIG. 9 is a view similar to that of FIG. 5 showing a further slightly modified arrangement, and FIG. 10 is a side view of a further transfer conveyor arrangement for a cigarette packing machine.

FIG. 1 shows part of a machine 10 for packing cigarettes in hinged lid packs. The machine includes a cigarette hopper 12 having three outlets 14, 16 and 18, each of which has associated with it a transfer conveyor arrangement 20 operable to deliver rows of cigarettes to a delivery drum 22.

An endless belt conveyor 24 carrying pockets 26 passes underneath the delivery drums 22 so that each pocket receives a row of cigarettes from one of the drums and subsequently contains three superimposed rows of cigarettes. Downstream of the drums 22 the conveyor 24 runs parallel to a further pocketed belt conveyor 28. An overhead transfer conveyor 30 carrying pushers 32 is operative to transfer groups of cigarettes from the pockets 26 to the pockets 34 of the conveyor 28. Subsequently the groups of cigarettes are successively plunged axially from the pockets 34 along a vertical run of the conveyor 28. During this axial plunge the groups are partially wrapped in a section of foil delivered along a path indicated at 36 and are received by a folding conveyor indicated at 37. The completion of the wrapping of the foil around the groups of cigarettes and the insertion of these wrapped groups in hinged lid packs does not form part of the present invention.

As shown in FIG. 2 each of the hopper outlets 14, 16, 18 contains a series of vanes 38 dividing the outlet into seven channels 40 each of which contains a column of cigarettes. The transfer conveyor arrangement 20 includes five planetary suction wheels 42 supported on a rotatable annular carrier 44. Each of the wheels 42 has seven flutes and is arranged so that each time the wheel is carried past the outlet 14 a cigarette from each of the channels 40 is picked up in one of the flutes.

A suction drum 46 is rotatable about the same axis as the carrier 44 and carries two opposed sets 48 of seven flutes. The drum 46 rotates at a higher angular speed than the carrier 44, the arrangement being such that each planetary wheel 42 transfers a row of seven cigarettes to one of the sets 48 during its passage away from the outlet 14, the row being subsequently conveyed by the drum 46 to a position at which it is transferred to the delivery drum 22. It should be noted that the drum 22 has opposed sets 50 of flutes similar to those of the drum 46. The drum 22 could be larger and have three or more sets of flutes.

In addition to the wheels 42 the carrier 44 has five support and guide segments 52 positioned between the respective wheels 42 and operative to hold cigarettes in a channel 40 other than when a wheel 46 is passing. The peripheral support surfaces of the segments 52 are inclined so that the lowermost cigarette in a channel 40 is progressively lowered as the next wheel 42 approaches: this assists loading of the cigarettes into the flutes on the wheels.

It will be understood that the wheels 42, and drums 46 and 22 are each provided with appropriate valving to allow suction to be turned on and off at the correct rotational position, so that pick up, conveyance and transfer of cigarettes occurs as described.

FIGS. 3–5 illustrate a slightly modified arrangement: for convenience, similar reference numbers have been used for parts corresponding to those shown in FIGS. 1 and 2. As seen particularly in FIG. 3, each of the planetary wheels 42 has nine flutes so that the flute sets 48 and 50 on the drums 46 and 22 also contain nine flutes (not all shown in FIG. 3).

Referring particularly to FIGS. 4 and 5, the transfer conveyor arrangement 20 and the drum 22 are driven from a drive pulley 60 (FIG. 4) connected by a timing belt 62 to a main drive of the machine 10. The pulley 60 is fixed to a sleeve 61 rotatable with a hollow drive shaft 64 which at one end is integral with a part forming one side of the drum 46. The other side of the drum 46 is integral with a coaxial shaft 66. The shaft 64 is rotatable around an internal stationary tube 68 containing an internal bore 70 through which suction is transmitted to the drum 46.

The drum 22 is similarly connected to a hollow shaft 72 which is parallel to the shaft 64 and which is driven from it by means of gears 74, 76 keyed to the respective shafts. The shaft 72 rotates around a stationary internal tube 78 having an internal bore 80 through which suction is supplied to the drum 22.

The gear 74 keyed to shaft 64 also engages with a gear 82 connected to one end of a stub shaft 84 carrying at its other end a further gear 86 which in turn is engaged with a sun gear 88 rotatable about an axis which is coaxial with the shaft 64.

Each planet wheel 42 comprises first and second coaxial laterally spaced parts 42A, 42B which respectively engage opposite ends of a cigarette conveyed in the flutes of the wheel. The planet wheel part 42B is connected to a short shaft which carries a coaxial planet gear 90 which is engaged with both the sun gear 88 and a stationary internal ring gear 92. The planet wheel part 42A, which evidently must move at the same rate as the planet wheel part 42B, is driven by way of a gear 94 connected to the end of a shaft 66 through gears 82A, 86A, sun gear 88A, gear 90A and ring gear 92A, which cooperate in the same way as the corresponding gears for the part 42B. The planet wheel parts 42A and 42B are respectively carried by laterally-spaced parts 44A, 44B of the carrier 44.

The guide and support segments 52 mounted on the carrier 44 each comprise laterally spaced parts each of which is capable of guiding and supporting a cigarette 100 at the bottom of a channel 40. Each segment 52 is pivotally attached at 102 to a generally cylindrical member 104 and is constrained by a compression spring 105 to lie normally against one side of a segmental slot 106 in the member. The member 104 is itself pivotally connected to the carrier 44 about the axis 102 and carries a cam roller 108 which is urged by a further compression spring 110 into engagement with a stationary generally annular cam surface 112 surrounding the shaft 64 or 66.

In FIG. 5 the segments 52 occupy positions which in use they would not normally occupy. The cam surface 112 is so shaped that the segments 52 occupy their laterally open position, i.e. as shown in dotted 26 lines, in the region where cigarettes are transferred between the drum 46 and the drum 22 (see FIG. 3). The segments 52 occupy their laterally closed position (as shown in full lines) when in the region of the hopper outlet, thereby providing support and guidance for the cigarettes in the chutes 40 as previously described. The segments 52 are movable from their closed to their open positions against the action of spring 105, i.e. by pivotal movement of the segment about the axis 102 within the segmental slot 106, in the event that the segment encounters any obstruction, e.g. a jammed cigarette in the vicinity of the drum 46.

FIGS. 6 and 7 show two stages in the transfer of cigarettes from a hopper outlet 14 to the delivery drum 22. Cigarettes in the nine channels of the outlet 14 have been numbered 1–9 in the order in which the cigarettes will be transferred to a planet wheel 42. The flutes on the wheels 42, and on the drums 46 and 22, have been correspondingly numbered to show which cigarettes they convey. For convenience of reference to individual planetary wheels 42 these have been referenced C,D,E,F, and G in FIGS. 6 and 7.

In FIG. 6 the wheel 42C has received its first cigarettes, the wheel 42D has received a full row of nine cigarettes and has delivered the first seven to the flute set 48A on the drum 46. The previous row of nine cigarettes (received by the wheel 42E) has already been transferred from the flute set 48B to the flute set 22B on the delivery drum 22. The first eight cigarettes of the row in the flute set 22A have already been transferred to a pocket 26 (FIG. 1).

In FIG. 7 the wheel 42C has received eight of its cigarettes and has already transferred four of these to the flute set 48B. The flute set 48A is transferring the row received from the wheel 42D to the flute set 22A. Note that the wheel 42E does not interfere with this transfer. Two of the row of cigarettes conveyed by the flute set 22B have been transferred to the next pocket 26 (FIG. 1).

As particularly shown in FIGS. 5 and 8, each planet wheel 42 includes suction passages 120 associated with each flute and terminating in apertures 122 which communicate with one of a pair of arcuate manifolds 124, 126 on a face of the carrier 44 against which the adjacent face of the wheel 42 rotates. The respective adjacent faces comprise carbon discs. The carrier 44 includes passages 128 connecting the manifold 124 with a fixed suction manifold 130 arranged internally of the carrier. The arrangement is such that, on rotation of the carrier 44, when a wheel 42 reaches the region of a hopper outlet 14 (or 16 or 18) the passages 128 connect with the manifold 130 so that suction is available via the suction manifold 124 at the flute required to receive the first cigarette. As can be seen in FIG. 8, suction remains connected to those flutes required to pick up and convey cigarettes while the wheel 42 passes the hopper outlet 14. On rotation of the wheel 42, when a flute passes a position corresponding to the end of the manifold 124, so that its associated aperture 122 is connected to the exhaust manifold 126, suction is relieved so that the cigarette is no longer retained. This position corresponds to the position at which it is required to transfer cigarettes to the drum 46. Suction is delivered to the manifold 130 by way of passages 132 (FIG. 5) passing through fixed structure of the machine.

In the arrangement shown in FIG. 9 the suction passages 120 associated with each flute of the planet wheels 42 include axially spaced radial bores 120A, 120B etc. which communicate with either a suction manifold 124 or an exhaust manifold 126. The bores 120A, 120B etc. are formed in the shafts connecting the respective planet wheels 42 and planet gears 90. The manifolds 124, 126 are formed in fixed members adjacent the ring gears 92. By providing axially-spaced bores 120A, 20B etc. it is possible to control suction to each flute precisely as required according to the rotational position of the wheels 42. By contrast, in the arrangement of FIG. 5, where several apertures 122 communicate with the arcuate manifold 124, some flutes receive suction at times when no cigarettes are present, leading to waste of suction.

Although the previous embodiments have been described with principal reference to use of three transfer conveyor arrangements 20 each for transferring a row of cigarettes to a delivery drum 22 and thence to a pocket 26, the packing machine could include only one such arrangement. Thus an arrangement in principle similar to that shown in FIG. 2 could be used to transfer a substantially continuous row of cigarettes onto a drum equivalent to the drum 22. More generally, the number of cigarettes transferred from the hopper outlet need not bear a direct relationship to the number of cigarettes eventually required to form a row of a group to be packaged. A continuous or other row of cigarettes carried on a fluted suction drum may be sub-divided into rows of predetermined length by selective transfer to a downstream conveyor, e.g. a further suction fluted drum, by appropriate control of suction at the transfer position. Such transfer techniques, e.g. using drums with appropriate internal suction valving, are well known in the tobacco industry.

The transfer conveyor arrangement shown in FIG. 10 includes hopper outlets 214, 216 and 218. The hopper outlet 216 is associated with a suction carrier 220 arranged to pick up a row of cigarettes from the outlet and transfer it to a pocket 222 of a rotary pocket drum 224. The carrier 220 is connected to a planetary gear 226 constrained to move on a circular path while maintained in engagement with a stationary annular ring gear 228. The resultant path of movement of the carrier 220 is an hypocycloid 230. Similar transfer arrangements are associated with the hopper outlets 214 and 218.

As the rotary pocket drum 224 rotates, each pocket 222 receives a first row of cigarettes from the carrier 220 associated with the hopper outlet 214 and then receives the second and third rows respectively from the carriers 220 associated with the hopper outlets 216 and 218. The groups containing three rows of cigarettes are transferred from the drum 224 in the region 232.

The carrier 220 need not be rigidly fixed to the planetary gear 226: it could for example be arranged so as to be pivotable about an axis parallel to the axis of the gear, with cams provided to control its angular position. In this way alignment of the carrier with the hopper outlet 214 216, 218 during pick up of a row of cigarettes and with the pocket 222 during transfer may be readily achieved. In addition, if necessary, the angular position of the carrier may be controlled during other stages of its movement on the hypocycloid path 230 so as to ensure that no interference occurs with other parts of the apparatus, e.g. parts of the pocket 222 during approach to the transfer position. It will be appreciated that the transverse speed of the carrier 220 is substantially zero at the position of cigarette pick-up and is substantially matched to the speed of the pocket 222 during transfer of the row to the packet.

The pockets 222 need not be arranged on a drum but could be carried by a belt, e.g. movable on a straight path as indicated at 240. In this case the hopper outlets would normally be appropriately arranged along the path of the belt, e.g. in a straight line, so as to transfer the rows in sequence to form a group of cigarettes in each pocket. The downstream arrangement of the pocketed conveyor could therefore be substantially the same as indicated in FIG. 1.

In the arrangement shown in FIG. 1 0 all of the cigarettes in a row may be transferred substantially simultaneously from the hopper outlet 214, 216 or 218 to the respective carrier 220. Although the bottom ends of the hopper outlets 214, 216 and 218 and the conveying surfaces of the carriers 220 have been depicted as substantially straight, this need not be the case: for example, the bottom row of cigarettes in a hopper outlet could have a convex or concave curve with the carrier 220 being similarly shaped to receive the row. In practice the degree to which the row may be curved may be limited by the requirement to transfer a relatively flat row to one of the pockets 222. Particularly where there is some degree of pivoting allowed by the carrier 220 a slight rolling action may be used to assist pick up of a row of cigarettes from a hopper outlet. Thus, although the cigarettes are not sequentially picked up in the way in which they are by the wheel 42 in the FIG. 2 arrangement, they may not be all picked up exactly simultaneously. The actual timing of the picking up of individual cigarettes of each row will substantially depend on the geometry of the hopper outlet and of the carrier and its movement.

I claim:

1. Apparatus for transferring rod-like articles including means for supplying rod-like articles in a direction transverse to the length thereof to a plurality of adjacent delivery positions arranged in a row, rotary conveyor means including means for receiving articles from said positions, and means for delivering articles in a row from said rotary conveyor means including a further conveyor, wherein the rotary conveyor means comprises a plurality of planetary wheels each having receiving means defining individual article positions, and an annular carrier for translating said wheels along a path extending adjacent said row so that said receiving means receives articles from said positions.

2. Apparatus for transferring rod-like articles including means for supplying articles to a plurality of adjacent delivery positions arranged in a single row, rotary conveyor means including means for receiving articles from said positions, and means for delivering articles in a row from said rotary conveyor means including a further conveyor, wherein the rotary conveyor means comprises a plurality of planetary wheels each having article receiving means defining individual article positions, and an annular carrier for translating said wheels along a path extending adjacent said row so that said receiving means receives articles from said positions, wherein said planetary wheels each have a number of article receiving means at least equal to the number of adjacent delivery positions in said single row, so that each wheel receives all of the articles of said single row of articles as said wheel is translated along said path past said delivery positions.

3. Apparatus for transferring rod-like articles including means for supplying articles to a plurality of adjacent delivery positions arranged in a row, rotary conveyor means including means for receiving articles from said positions, and means for delivering articles in a row from said rotary conveyor means including a further conveyor, wherein the rotary conveyor means comprises a plurality of planetary wheels each having receiving means defining individual article positions, and an annular carrier for translating said wheels along a path extending adjacent said row so that said receiving means receives articles from said positions, said further conveyor being arranged to receive said articles on a path portion which lies radially inward of the path of the wheels relative to the axis of the annular carrier.

4. Apparatus as claimed in claim 3, wherein said planetary wheels and carrier are arranged so that articles in a row are received sequentially by each wheel as it is translated along said path.

5. Apparatus as claimed in claim 3, wherein said further conveyor includes means defining individual article positions.

6. Apparatus as claimed in any preceding claim, wherein the conveyor means comprises a plurality of planetary wheels and the translating means comprises an annular carrier for said wheels.

7. Apparatus as claimed in claim 3, wherein said receiving means defining individual article positions comprises flutes defining positions for at least the number of delivery positions arranged in said row.

8. Apparatus as claimed in any preceding claim, wherein the wheels are arranged to deliver successive rows of articles to said further conveyor in such manner that there are spaces between successive rows.

9. Apparatus as claimed in claim 8, wherein the further conveyor comprises a fluted drum rotatable about the same axis as the annular carrier and having a lesser radius than that of the path of the wheels.

10. Apparatus as claimed in claim 9, wherein the wheels are capable of receiving an article from one of said delivery positions in one flute substantially while transferring an article from another flute to said rotary drum.

11. Apparatus for transferring rod-like articles including means for supplying articles to a plurality of adjacent delivery positions arranged in a row, conveyor means including means for receiving articles from said positions, and means for delivering articles in a row from said conveyor means including a further conveyor, wherein the conveyor means comprises at least one planetary wheel and includes means defining an annular path for said planetary wheel (226) extending adjacent said delivery positions and said further conveyor, and the means for receiving articles from said positions is arranged to receive a row of articles from said delivery positions substantially simultaneously.

12. Apparatus as claimed in claim 11, wherein the receiving means is constrained to move on a path which describes an hypocycloid.

13. Apparatus as claimed in claim 12, wherein the receiving means comprises means carried by the planetary wheel and arranged to receive a row of articles at a node of the hypocycloid path and to deliver said articles at a position between nodes on said path.

14. Apparatus as claimed in any preceding claim, further including a group conveyor having a series of spaced carrier means, said carrier means being arranged to receive groups of articles, wherein each of said groups comprises at least two superimposed rows of articles, said rows being received at positions spaced along the path of said group conveyor, and at least one of said rows being received from said delivering means.

15. Apparatus as claimed in claim 14, wherein said delivering means includes first and second fluted drums which convey successive rows in spaced series from said conveyor means towards said group conveyor.

16. Apparatus for transferring rod-like articles, including means for supplying articles to a plurality of adjacent delivery positions arranged in a row, first rotary conveyor means including means for receiving articles from said positions, and second rotary conveyor means including means for receiving articles from said first conveyor means, wherein said first and second rotary conveyor means are rotatable about a common axis, said second rotary conveyor means being arranged radially inward of said first rotary conveyor means relative to said axis.

17. Apparatus as claimed in claim 16, wherein said first conveyor means comprises at least one planetary conveyor.

18. Apparatus as claimed in claim 17, wherein the first conveyor means comprises a plurality of fluted planetary conveyors carried by an annular member.

19. Apparatus as claimed in claim 18, wherein said second conveyor means comprises a fluted drum arranged radially inward of the path of said annular member.

20. Apparatus for transferring rod-like articles including means for supplying articles to a plurality of adjacent delivery positions arranged in a row, rotary conveyor means including means for receiving articles from said positions, and means for delivering articles in a row from said rotary conveyor means including a further conveyor, wherein the rotary conveyor means comprises a plurality of planetary wheels each having receiving means defining individual article positions, and an annular carrier for translating said wheels along a path extending adjacent said row so that said receiving means receives articles from said positions, wherein said planetary wheels are arranged relative to said annular carrier so that each wheel receives all of the articles of a given row of articles at said adjacent delivery positions as said wheel is translated along said path past said row of adjacent delivery positions.

\* \* \* \* \*